(No Model.)
H. W. CALDWELL.
COUPLING FOR HOLLOW SHAFTS.
No. 501,918. Patented July 25, 1893.
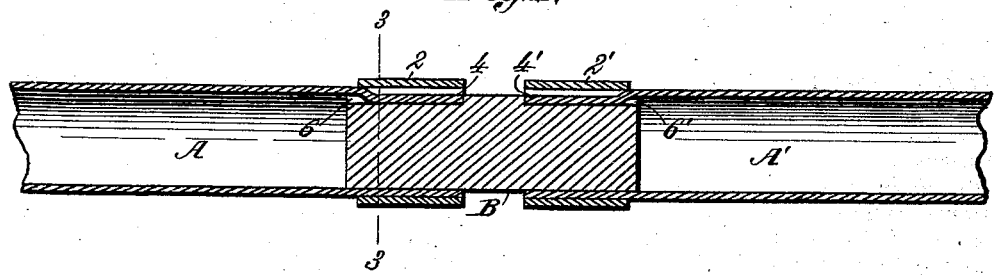
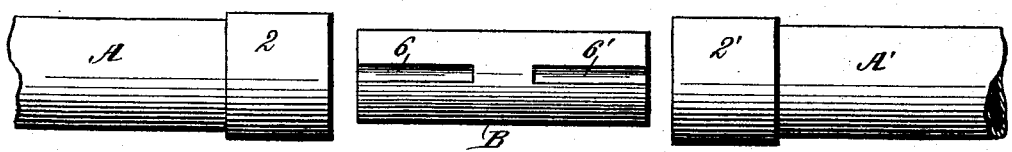
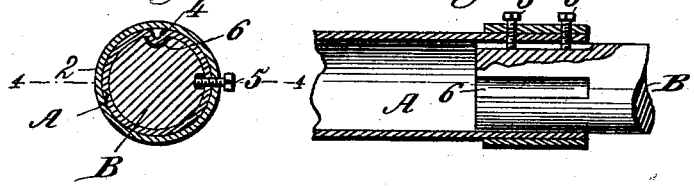 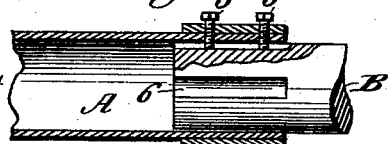 
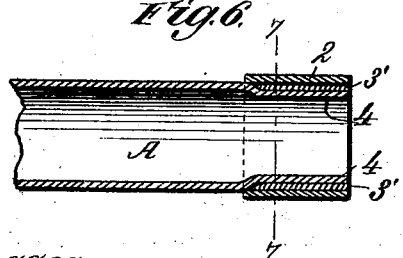 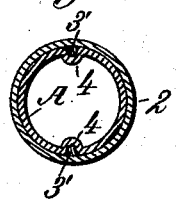
Witnesses
Robert Garrett
Ralph VanDyke
Inventor
Henry W. Caldwell
By Bond, Adams, Pickard & Jackson
Attys

UNITED STATES PATENT OFFICE.

HENRY W. CALDWELL, OF CHICAGO, ILLINOIS.

COUPLING FOR HOLLOW SHAFTS.

SPECIFICATION forming part of Letters Patent No. 501,918, dated July 25, 1893.

Application filed December 13, 1892. Serial No. 455,103. (No model.)

*To all whom it may concern:*

Be it known that I, HENRY W. CALDWELL, a citizen of the United States, residing at Chicago, in the county of Cook and State of Illinois, have invented certain new and useful Improvements in Couplings for Hollow Shafts, of which the following is a specification, reference being had to the accompanying drawings, in which—

Figure 1 is a longitudinal sectional view, showing the end portions of two shafts coupled together according to my invention. Fig. 2 is a plan view, showing the shafts and the coupling-core separated from each other. Fig. 3 is a sectional view taken on the line 3—3, Fig. 1. Fig. 4 is a sectional view taken on the line 4—4 Fig. 3. Fig. 5 is a view similar to Fig. 3, omitting the coupling-core. Fig. 6 is a longitudinal sectional view of one end portion of a shaft, showing a modification of my invention; and Fig. 7 is a sectional view taken on the line 7—7, Fig. 6.

My invention relates to couplings for hollow shafts which are subjected to a torsional strain, and is especially adapted for use in connection with screw conveyers.

Heretofore the coupling commonly used for uniting the ends of conveyer shafts consisted of a core fitted into the ends of the hollow conveyer shafts and secured in place by means of bolts passing through the conveyer shaft and core. The objection to this coupling is that the bolts, being subjected to a torsional strain, by the jerking action of the different lengths of conveyer wear away the bolt holes in the shaft and gradually weaken the conveyer at the ends. In addition to this objection, the bolt heads project into the space along which the material to be conveyed passes, and thereby reduce the carrying capacity of the conveyer.

My invention has for its object to provide a coupling device which will secure the greatest torsional strength at the ends of the conveyer lengths, and at the same time present as little obstruction as possible to the passage of the material. I accomplish this object as hereinafter specified and as illustrated in the drawings. That which I regard as new will be pointed out in the claims.

In the drawings,—A indicates the end of a conveyer shaft, which is tubular, and A' indicates a second conveyer shaft which is adapted to be coupled to the shaft A.

B indicates a core or coupling shaft which is adapted to fit into the ends of the two shafts A A'. Each shaft A A' is provided at its ends with one or more feathers or splines 4, 4', which project inward and are integral with the shaft. I form these splines by swaging them in the shaft, by which means the material of the shaft is utilized and the necessity of joining the feathers or splines to the shaft is avoided and the shaft is not weakened by cutting away any portion of it. The splines or feathers 4, 4' may be round, as shown, or they may be of any other suitable shape.

6, 6' indicate grooves formed in the core or coupling shaft B, which grooves are adapted to receive the splines 4, 4'.

2, 2' indicate collars which are fitted upon the shafts A, A' respectively, over their ends, and are welded thereto.

In order to further strengthen the coupling the space between the splines 4, 4' and the collars 2, 2' is filled by metal pieces 3', as best shown in Figs. 6 and 7.

In order to prevent any shaking or vibration of the core or coupling shaft which would tend to wear away the splines or feathers, I further secure such shaft in place by the use of bolts or set-screws 5, 5', one or more of which may be used; which bolts pass through the collar 2 and shaft A and bear against the core or coupling-shaft B.

I am aware of Letters Patent No. 272,006, to Webster and Chivill, February 6, 1883, but the coupling shown in that patent provides for the use of an interior core held in place by splines or feathers formed on an exterior collar, and projecting through slots in the ends of the conveyer shafts into recesses in the core. The whole is then held firmly in place by bolts.

By my invention I avoid weakening the conveyer-shaft by cutting it away, as this is a serious objection, as by cutting the shaft it is so weakened that torsional strain on the conveyer is likely to twist it off.

That which I claim as my invention, and desire to secure by Letters Patent, is—

1. In a shaft-coupling, the combination with tubular shafts having splines or feathers, of a core-coupling connecting the shafts together, and having grooves into which the splines or feathers extend, substantially as set forth.

2. In a shaft-coupling, the combination with tubular shafts having splines or feathers, of a core-coupling connecting the shafts together, and having grooves into which the splines or feathers extend, and exterior collars covering and protecting the core coupled ends of the shafts, substantially as described.

3. In a shaft-coupling, the combination with tubular shafts having splines or feathers, of a core-coupling connecting the shafts together, and having grooves into which the splines or feathers extend, exterior collars covering and protecting the core coupled ends of the shafts, and bolts or screws passing through the collars and shafts and bearing against the core-coupling to hold it against vibration, substantially as described.

4. In a shaft-coupling, the combination with tubular shafts, of a core fitted into said shafts, splines or feathers projecting into said shafts, and fitted into grooves in said core, and one or more bolts for holding said core against vibration, substantially as described.

HENRY W. CALDWELL.

Witnesses:
JOHN L. JACKSON,
RALPH VAN DYKE.